United States Patent
Kono et al.

(10) Patent No.: US 6,399,254 B1
(45) Date of Patent: *Jun. 4, 2002

(54) SOLID ELECTROLYTE

(75) Inventors: Michiyuki Kono, Osaka; Eriko Ishiko, Hyogo, both of (JP)

(73) Assignee: Dai-Ichi Kogyo Seiyaku Co., Ltd., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/454,778

(22) Filed: Jan. 4, 2000

Related U.S. Application Data

(63) Continuation-in-part of application No. 09/080,318, filed on May 15, 1998, now abandoned.

(30) Foreign Application Priority Data

May 23, 1997 (JP) .............................. 9-133735

(51) Int. Cl.[7] .................................. H01M 6/18

(52) U.S. Cl. ..................... 429/304; 429/317; 429/324; 252/62.2

(58) Field of Search .................. 252/62.2; 429/304, 429/317, 324

(56) References Cited

U.S. PATENT DOCUMENTS 5,436,090 A * 7/1995 Kono et al. ................. 429/191
6,190,804 B1 * 2/2001 Ishiko et al. ................. 429/306

* cited by examiner

*Primary Examiner*—Margaret Einsmann
*Assistant Examiner*—Brian P. Mruk
(74) *Attorney, Agent, or Firm*—Jordan and Hamburg LLP

(57) ABSTRACT

Provided is a solid electrolyte having a reduced amount of non-crosslinked monomers, capable of being cured rapidly to have good film-forming ability, and having high electro-conductivity. The solid electrolyte is prepared by crosslinking a composition that consists essentially of a polymer compound, a solvent and an electrolytic salt through exposure to active radiations and/or under heat, in which the polymer compound has four functional polymer chains of formula (I):

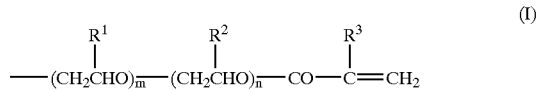

$R^1$ and $R^2$ each represent a hydrogen atom or a lower alkyl group, $R^3$ represents a hydrogen atom or a methyl group, m and n each represent 0 or an integer of 1 or more, and $m+n \geq 35$ in one polymer chain.

3 Claims, No Drawings

SOLID ELECTROLYTE

REFERENCE TO RELATED APPLICATION

This is a continuation-in-part of application Ser. No. 09/080,318, filed May 15, 1998 now abandoned.

BACKGROUND OF THE INVENTION

The present invention relates to a solid electrolyte with ionic conductivity, which. can be used in batteries, capacitors, electrochromic devices (ECD), sensors, etc.

Solid electrolytes with ionic conductivity have heretofore been proposed, which are obtained, for example, by mixing an acryloyl-modified polymer compound having an alkylene oxide polymer chain and an electrolytic salt optionally along with a solvent followed by crosslinking the mixture by heating it or exposing it to light or electronic rays.

For example, known are a solid polyelectrolyte comprising a combination of a tri-functional polymer having a terminal acryloyl-modified alkylene oxide polymer chain, a low-molecular alkylene oxide copolymer, polyvinyl chloride and an electrolytic salt (see Japanese Patent Application Laid-Open (JP-A) Hei-3-177409), a solid electrolyte comprising a combination of the same terminal acryloyl-modified alkylene oxide copolymer as above, an inorganic ionic salt and an organic solvent such as propylene carbonate (see JP-A Sho-63-94501), and a solid electrolyte comprising a combination of a bi-functional and/or mono-functional polymer compound having a terminal acryloyl-modified alkylene oxide polymer chain, and an electrolytic salt (see JP-A Hei-5-178948).

However, those conventional solid electrolytes that are obtained by exposing them to active radiations and/or heating them are problematic in that the storage stability of the cured products is poor because of the non-crosslinked monomers still remaining in them.

The present invention has been made in consideration of the problems in the prior art, and the subject matter of the invention is to provide a solid electrolyte, which, when cured under the same condition as that for the conventional solid electrolytes noted above, contains a reduced amount of non-crosslinked monomers, which has an excellent film-forming ability as being able to be cured rapidly, and of which the electroconductivity is comparable to that of conventional electrolytic solutions.

SUMMARY OF THE INVENTION

The solid electrolyte of the present invention is prepared by crosslinking a composition that consists essentially of a polymer compound, a solvent and an electrolytic salt through exposure to active radiations and/or under heat, and is characterized in that the polymer compound has four functional polymer chains of a general formula (I):

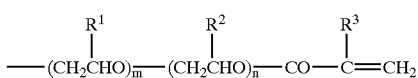

(I)

wherein $R^1$ and $R^2$ each represent a hydrogen atom or a lower alkyl group;

$R^3$ represents a hydrogen atom or a methyl group;

m and n each represent 0 or an integer of 1 or more, and m+n≧35 in one polymer chain; and wherein $R^1$ $R^2$, $R^3$, m and n each may be the same or different in the four functional polymer chains.

The polymer compound is hereinunder referred to as "tetra-functional, terminal acryloyl-modified alkylene oxide polymer".

In the solid electrolyte, the polymer compound may have a structure of a general formula (II):

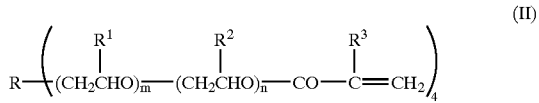

(II)

wherein R represents a residue of a starting substance, $R^1$, $R^2$, $R^3$, m and n have the same meanings as in formula (I). Those four $R^1$'s, $R^2$'s, $R^3$'s, m's and n's each may be the same or different in one molecule of the polymer compound.

In each of formulas (I) and (II), (a) if m and n is each an integer of 1 or more, then at least one of $R^1$ and $R^2$ is a lower alkyl group, (b) if m is 0, then $R^2$ is a lower alkyl group, and (c) if n is 0, then $R^1$ is a lower alkyl group.

In the solid electrolyte of the invention, the solvent is preferably at least one selected from the group consisting of cyclic esters, cyclic carbonates, cyclic ethers, nitrites, linear ethers, linear carboxylates, linear carbonates, sulfolane, sulfolane derivatives, dimethylsulfoxide, N,N-dimethylformamide, and N-methyloxazolidinone.

Of that type, the amount of the solvent in the solid electrolyte is preferably from 220 to 1,900% by weight relative to the polymer compound therein.

DETAILED DESCRIPTION OF THE INVENTION

To obtain the tetra-functional, terminal acryloyl-modified alkylene oxide polymer for use in the invention, for example, an active hydrogen compound, such as diglycerin or pentaerythritol, is used as the starting substance, and an alkylene oxide, which is mentioned hereinunder, is added thereto, and is then esterified with an unsaturated organic acid such as acrylic acid or methacrylic acid, or is then reacted with an acid chloride such as acrylic acid chloride or methacrylic acid chloride through dehydrochlorination.

Specific examples of the polymer are mentioned below with reference to $R^1$, $R^2$, $R^3$, m and n in formula (II).

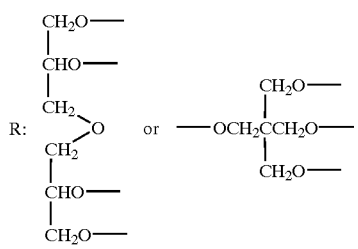

$R^1$: —H, —$CH_3$, —$C_2H_5$, $R^2$: —H, —$CH_3$, —$C_2H_5$ $R^3$: —H, —$CH_3$, m: 0~130, n: 0~130.

The active hydrogen compound to be used as the starting substance may have four functional groups, of which the type is not specifically defined. However, preferred are diglycerin and pentaerythritol, as having high reactivity with alkylene oxides. Apart from these, also employable are methyl glucoside, ethylene diamine and aromatic diamines.

The alkylene oxides to be used in producing those tetra-functional alkylene oxide polymers include, for example, ethylene oxide, propylene oxide, 1,2-epoxyhexane, 1,2-epoxyoctane, etc. Preferred are ethylene oxide, propylene oxide, and butylene oxide. The number of the monomers constituting each functional polymer chain, or that is, each polyalkylene oxide chain in the tetra-functional alkylene oxide polymer must be not smaller than 35, preferably from 35 to 150, more preferably from 40 to 120.

If the number of the monomers in each unit chain is smaller than 35, such is problematic in that the polymer is difficult to crosslink in a solvent of being not smaller than 220% by weight relative to the polymer and that the solvent used greatly bleeds out onto the surface of the crosslinked product. Where two different monomers are used to produce the polymer, the sequence of the monomer units in the polymer is not specifically defined, and the polymer may be any of block or random copolymers.

Any and every solvent well miscible with the polymer is employable to give the solid electrolyte of the invention. However, preferred are one or more selected from the group consisting of cyclic esters, cyclic carbonates, cyclic ethers, nitrites, linear ethers, linear carboxylates, linear carbonates, sulfolane, sulfolane derivatives, dimethylsulfoxide, N,N-dimethylformamide, and N-methyloxazolidinone, as they can dissolve ionic compounds and have good conductivity. Of those, especially preferred are cyclic esters and cyclic carbonates.

The ratio of the solvent to the polymer is generally from 220 to 1,900% by weight, but preferably from 220 to 1,200% by weight, more preferably from 230 to 1,000% by weight. If the amount of the solvent is smaller than 220% by weight, the conductivity of the solid electrolyte obtained will be low. On the other hand, if the amount is larger than 1,900% by weight, the mechanical strength of the solid electrolyte will be greatly lowered.

The solid electrolytic salt for use in the invention is at least one selected from the group consisting of lithium fluoride, lithium chloride, lithium bromide, lithium iodide, lithium nitrate, lithium thiocyanate, lithium perchlorate, lithium trifluoromethanesulfonate, lithium tetraborofluoride, bistrifluoromethylsulfonylimide lithium, tristrifluoromethylsulfonylmethide lithium, sodium thiocyanate, sodium perchlorate, sodium trifluoromethanesulfonate, sodium tetraborofluoride, potassium thiocyanate, potassium perchlorate, potassium trifluoromethanesulfonate, potassium tetraborofluoride, magnesium thiocyanate, magnesium perchlorate and magnesium trifluoromethanesulfonate. The ratio of the electrolytic salt to the solvent is generally from 0.2 to 3.0 mols/liter, but preferably from 0.5 to 2.0 mols/liter.

As the means of crosslinking the polymer-containing composition to obtain the solid electrolyte of the invention, employable are active radiations such as UV rays, visible rays and electron rays. Apart from those, heating is also effective.

If desired, a photopolymerization initiator such as trimethylsilylbenzophenone, benzoin, 2-methylbenzoin, 4-methoxybenzophenone, benzoin methyl ether-anthraquinone or benzyldimethyl ketal, or a polymerization initiator such as benzoyl peroxide, methyl ethyl ketone peroxide or α,α'-azobisisobutyronitrile may be added to the composition being crosslinked.

The method of producing the solid electrolyte of the invention is not specifically defined. For example, the polymer is mixed with a solvent that contains an electrolytic salt having been dissolved therein to give a uniform mixture; or the polymer is uniformly mixed with a solvent and an electrolytic salt. The resulting solution is applied onto a substrate, for example, through bar-coating, spin-coating or screen-coating to form thereon a uniform layer, which is then crosslinked according to the means mentioned above. Thus is easily obtained the solid electrolyte of the invention.

Now, the invention is described in more detail with reference to the following Examples, which, however, are not intended to restrict the scope of the invention.

(1) Production of Tetra-functional, Terminal Acryloyl-modified Alkylene Oxide Polymers:

PRODUCTION EXAMPLE 1

Compound No. A-1

166 g of a starting substance, diglycerin, 12.2 g of a catalyst, potassium hydroxide, and 6,280 g of ethylene oxide were put into a 10-L autoclave (L indicates liter in volume, and the same shall apply hereinunder), and reacted at 130° C. for 5 hours, and then neutralized and desalted to obtain 6,180 g of a tetra-functional ethylene oxide homopolymer. This polymer was found to have a weight-average molecular weight (hereinafter referred to as molecular weight) of 6,350, as calculated on the basis of its hydroxyl value.

1,270 g (0.2 mols) of the polymer, 86.5 g (1.2 mols) of acrylic acid, 700 g of toluene, and 3 g of a catalyst, concentrated sulfuric acid were put into a 3-L four-neck flask, and reacted for 10 hours with stirring under reflux, while water formed was removed from the reaction system. Then, this was neutralized, desalted and purified, and toluene was removed therefrom. Thus was obtained the intended, tetra-functional, terminal acryloyl-modified ethylene oxide homopolymer of formula (II) where R, $R^1$, $R^3$, m and n are as follows:

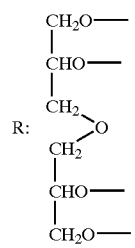

$R^1$: —H,
$R^3$: —H, m: 35, n: 0.

The molecular weight of the polymer was found to be 6,570 through gel permeation chromatography (hereinafter referred to as GPC).

PRODUCTION EXAMPLE 2

Compound No. A-2

166 g of a starting substance, diglycerin, 20 g of a catalyst, potassium hydroxide, 4,950 g of ethylene oxide, and 1,650 g of propylene oxide were put into a 10-L autoclave, and reacted at 115° C. for 7 hours, and then neutralized and desalted to obtain 6,540 g of a tetra-functional ethylene oxide-propylene oxide random copolymer. This polymer had a molecular weight of 6,820 (as calculated from its hydroxyl value).

1,340 g (0.2 mols) of the copolymer, 86.5 g (1.2 mols) of acrylic acid, 700 g of toluene, and 4 g of a catalyst, concentrated sulfuric acid were put into a 3-L four-neck flask, and reacted for 10 hours with stirring under reflux, while water formed was removed from the reaction system. Then, this was neutralized, desalted and purified, and toluene was removed therefrom. Thus was obtained the intended, tetra-functional, terminal acryloyl-modified ethylene oxide-propylene oxide random copolymer of formula (II) where R, $R^1$, $R^2$, $R^3$, m and n are as follows:

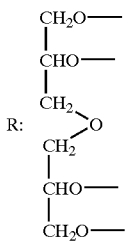

$R^1$: —H, $R^2$: —$CH_3$, $R^3$: —H, m: 28, n: 7.

The molecular weight of the polymer was 7,040 (as measured through GPC).

PRODUCTION EXAMPLE 3

Compound No. A-3

In the same manner as in Production Example 2, except that the amount of ethylene oxide and that of propylene oxide were 7.040 g and 2,320 g, respectively, obtained was the intended, tetra-functional, terminal acryloyl-modified ethylene oxide-propylene oxide random copolymer of formula (II) where R, $R^1$, $R^2$, $R^3$, m and n are as follows:

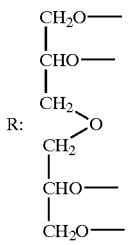

$R^1$: —H, $R^2$: —$CH_3$, $R^3$: —H, m: 40, n: 10.

The molecular weight of the polymer was 9,750 (as measured through GPC).

PRODUCTION EXAMPLE 4

Compound No. A-4

166 g of a starting substance, diglycerin, 53 g of a catalyst, potassium hydroxide, 10,600 g of ethylene oxide, and 6,970 g. of propylene oxide were put into a 20-L autoclave, and reacted at 115° C. for 10 hours, and then neutralized and desalted to obtain 17,100 g of a tetra-functional ethylene oxide-propylene oxide random copolymer. This polymer had a molecular weight of 17,700 (as calculated from its hydroxyl value).

1,770 g (0.1 mols) of the copolymer, 43 g (0.6 mols) of acrylic acid, 1,500 g of toluene, and 10 g of a catalyst, paratoluenesulfonic acid were put into a 5-L four-neck flask, and reacted for 12 hours with stirring under reflux, while water formed was removed from the reaction system. Then, this was neutralized, desalted and purified, and toluene was removed therefrom. Thus was obtained the intended, tetra-functional, terminal acryloyl-modified ethylene oxide-propylene oxide random copolymer of formula (II) where R, $R^1$, $R^2$, $R^3$, m and n are as follows:

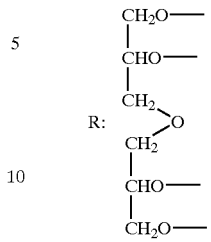

$R^1$: —H, $R^2$: —$CH_3$, $R^3$: —H, m: 60, n 30.

The molecular weight of the polymer was 17,900 (as measured through GPC).

PRODUCTION EXAMPLE 5

Compound No. 5

166 g of a starting substance, diglycerin, 58 g of a catalyst, potassium hydroxide, 5,320 g of ethylene oxide, and 13,990 g of propylene oxide were put into a 25-L autoclave, and reacted at 115° C. for 12 hours, and then neutralized and desalted to obtain 19,300 g of a tetra-functional ethylene oxide-propylene oxide random copolymer. This polymer had a molecular weight of 19,370 (as calculated from its hydroxyl value).

1,937 g (0.1 mols) of the copolymer, 43 g (0.6 mols) of acrylic acid, 1,200 g of toluene, and 10 g of a catalyst, paratoluenesulfonic acid were put into a 5-L four-neck flask, and reacted for 12 hours with stirring under reflux, while water formed was removed from the reaction system. Then, this was neutralized, desalted and purified, and toluene was removed therefrom. Thus was obtained the intended, tetra-functional, terminal acryloyl-modified ethylene oxide-propylene oxide random copolymer of formula (II) where R, $R^1$, $R^2$, $R^3$, m and n are as follows:

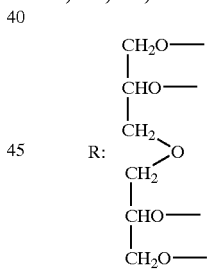

$R^1$: —H, $R^2$: —$CH_3$, $R^3$: —H, m: 30, n: 60.

The molecular weight of the copolymer was 19,590 (as measured through GPC).

PRODUCTION EXAMPLE 6

Compound No. A-6

136 g of a starting substance, pentaerythritol, 78 g of a catalyst, potassium hydroxide, and 14,130 g of ethylene oxide were. put into a 30-L autoclave, and reacted at 140° C. for 11 hours. Next, 11,700 g of propylene oxide was added to this and further reacted at 110° C. for 16 hours, and then neutralized and desalted to obtain 25,900 g of a tetra-functional ethylene oxide-propylene oxide block copolymer. This polymer had a molecular weight of 26,000 (as calculated from its hydroxyl value).

2,600 g (0.1 mols) of the copolymer, 52 g (0.6 mols) of methacrylic acid, 1,500 g of toluene, and 30 g of a catalyst, paratoluenesulfonic acid were put into a 5-L four-neck flask, and reacted for 12 hours with stirring under reflux, while water formed was removed from the reaction system. Then, this was neutralized, desalted and purified, and toluene was removed therefrom. Thus was obtained the intended, tetra-functional, terminal acryloyl-modified ethylene oxide-propylene oxide block copolymer of formula (II) where R, $R^1$, $R^2$, $R^3$, m and n are as follows:

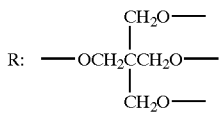

$R^1$: —H, $R^2$: —$CH_3$, $R^3$: —$CH_3$, m: 80, n: 50.

The molecular weight of the polymer was 26,230 (as measured through GPC).

PRODUCTION EXAMPLE 7

Compound No. A-7

166 g of a -starting substance, diglycerin, 40 g of a catalyst, potassium hydroxide, and 11,600 g -of propylene oxide were put into a 30-L autoclave, and reacted at 120° C. for 15 hours, and then neutralized and desalted to obtain 11,650 g of a tetra-functional propylene oxide homopolymer. This polymer had a molecular weight of 11,760 (as calculated on the basis of its hydroxyl value).

1,176 g .(0.1 mols) of the polymer, 43 g (0.6 mols) of acrylic acid, 1,500 g of toluene, and 12 g of a catalyst, paratoluenesulfonic acid were put into a 5-L four-neck flask, and reacted for 15 hours with stirring under reflux, while water formed was removed from the reaction system. Then, this was neutralized, desalted and purified, and toluene was removed therefrom. Thus was obtained the intended, tetra-functional, terminal acryloyl-modified propylene oxide homopolymer of formula (II) where R, $R^1$, $R^3$, m and n are as follows:

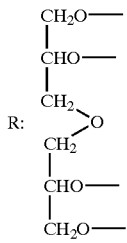

$R^1$: —$CH_3$, $R^3$: —H, m: 50, n: 0.

The molecular weight of the polymer was 11,980 (as measured through GPC).

PRODUCTION EXAMPLE 8

Compound No. A-8

136 g of a starting substance, pentaerythritol, 48 g of a catalyst, potassium hydroxide, and 15,860 g of butylene oxide were put into a 20-L autoclave, and reacted at 120° C. for 18 hours, and then neutralized, desalted and purified to obtain 15,930 g of a tetra-functional butylene oxide homopolymer. This polymer had a molecular weight of 15,990 (as calculated on the basis of its hydroxyl value).

1,599 g (0.1 mols) of the polymer, 43 g (0.6 mols) of acrylic acid, 1,600 g of toluene, and 40 g of a catalyst, paratoluenesulfonic acid were put into a 5-L four-neck flask, and reacted for 12 hours with stirring under reflux, while water formed was removed from the reaction system. Then, this was neutralized, desalted and purified, and toluene was removed therefrom. Thus was obtained the intended, tetra-functional, terminal acryloyl-modified butylene oxide homopolymer of formula (II) where R, $R^1$, $R^3$, m and n are as follows:

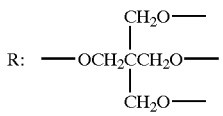

$R^1$: —$C_2H_3$, $R^3$: —H, m: 55, n 0.

The molecular weight of the polymer was 16,270 (as measured through GPC).

PRODUCTION EXAMPLE 9

Compound No. A-9

166 g of a starting substance, diglycerin, 30 g of a catalyst, potassium hydroxide, 7,040 g of ethylene oxide, and 2,880 g of butylene oxide were put into a 20-L autoclave, and reacted at 110° C. for 14 hours, and then neutralized, desalted and purified to obtain 9,800 g of a tetra-functional ethylene oxide-butylene oxide copolymer. This polymer had a molecular weight of 10,090 (as calculated from its hydroxyl value).

1,009 g (0.1 mols) of the polymer, 43 g (0.6 mols) of acrylic acid, 2,000 g of toluene, and 40 g of a catalyst, paratoluenesulfonic acid were put into a 5-L four-neck flask, and reacted for 10 hours with stirring under reflux, while water formed was removed from the reaction system. Then, this was neutralized, desalted and purified, and toluene was removed therefrom. Thus was obtained the intended, tetra-functional, terminal acryloyl-modified ethylene oxide-butylene oxide copolymer of formula (II) where R, $R^1$, $R^2$, $R^3$, m and n are as follows:

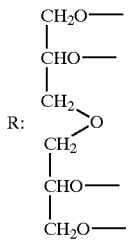

$R^1$: —H, $R^2$: —$C_2H_3$, $R^3$: —H, m: 40, n: 10.

The molecular weight of the polymer was 10,300 (as measured through GPC).

PRODUCTION EXAMPLE 10

Compound No. A-10

166 g of a starting substance, diglycerin, 32 g of a catalyst, potassium hydroxide, 9,290 g of propylene oxide, and 1,460 g of butylene oxide were put into a 15-L autoclave, and reacted at 110° C. for 16 hours, and then neutralized, desalted and purified to obtain 9,900 g of a tetra-functional propylene oxide-butylene oxide copolymer. This polymer had a molecular weight of 10,900 (as calculated from its hydroxyl value).

1,090 g (0.1 mols) of the polymer, 52 g (0.6 mols) of methacrylic acid, 1,300 g of toluene, and 7.5 g of a catalyst, sulfuric acid were put into a 3-L four-neck flask, and reacted for 12 hours with stirring under reflux, while water formed was removed from the reaction system. Then, this was neutralized, desalted and purified, and toluene was removed therefrom. Thus was obtained the intended, tetra-functional, terminal methacryloyl-modified propylene oxide-butylene oxide random copolymer of formula (II) where R, $R^1$, $R^2$, $R^3$, m and n are as follows:

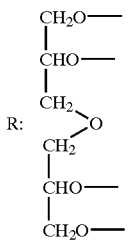

$R^1$: —$CH_3$, $R^2$: —$C_2H_5$, $R^3$: —$CH_3$, m: 40, n 5.

The molecular weight of the polymer was 11,170 (as measured through GPC).

The structure and the molecular weight of the tetra-functional, terminal acryloyl-modified alkylene oxide polymers obtained in Production Examples 1 to 10 are shown in Table 1.

water formed was removed from the reaction system. Then, this was neutralized, desalted and purified, and toluene was removed therefrom. Thus was obtained a tri-functional, terminal acryloylated ethylene oxide-propylene oxide random copolymer. The polymer had a molecular weight of 3,760 (as measured through GPC).

COMPARATIVE PRODUCTION EXAMPLE 2

Compound No. B-2

106 g of a starting substance, diethylene glycol, 21 g of a catalyst, potassium hydroxide, 3,530 g of ethylene oxide, and 3,500 g of propylene oxide were put into a 10-L autoclave, and reacted at 120° C. for 8 hours, and then neutralized, desalted and purified to obtain 6,900 g of a bi-functional ethylene oxide-propylene oxide random copolymer. This polymer had a molecular weight of 7,100 (as calculated from its hydroxyl value).

1,420 g (0.2 mols) of the copolymer, 43 g (0.6 mols) of acrylic acid, 1,420 g of toluene, and 2 g of a catalyst, concentrated sulfuric acid were put into a 3-L four-neck flask, and reacted for 10 hours with stirring under reflux, while water formed was removed from the reaction system. This was desalted and purified, then neutralized and toluene was removed therefrom. Thus was obtained a bi-functional, terminal acryloyl-modified ethylene oxide-propylene oxide random copolymer. The polymer had a molecular weight of 7,210 (as measured through GPC).

TABLE 1

| Compound No. | Starting Substance(*1) | Monomers(*2) | | | Monomer Sequence(*3) | Molecular Weight of Non-modified Polymer | Terminal Group(*4) | Molecular Weight of Terminal-modified Polymer |
|---|---|---|---|---|---|---|---|---|
| | | EO | PO | BO | | | | |
| A-1 | DG | 35 | — | — | H | 6,350 | A | 6,570 |
| A-2 | DG | 28 | 7 | — | R | 6,820 | A | 7,040 |
| A-3 | DG | 40 | 10 | — | R | 9,530 | A | 9,750 |
| A-4 | DG | 60 | 30 | — | R | 17,700 | A | 17,900 |
| A-5 | DG | 30 | 60 | — | R | 19,370 | A | 19,590 |
| A-6 | PE | 80 | 50 | — | B | 26,000 | M | 26,230 |
| A-7 | DG | — | 50 | — | H | 11,760 | A | 11,980 |
| A-8 | PE | — | — | 55 | H | 15,990 | A | 16,270 |
| A-9 | DG | 40 | — | 10 | R | 10,090 | A | 10,300 |
| A-10 | DG | — | 40 | 5 | R | 10,900 | M | 11,170 |

(*1)DG: diglycerin, PE: pentaerythritol
(*2)EO: ethylene oxide, PO: propylene oxide, BO: butylene oxide
The numeral indicates the number of monomer units in one polyalkylene oxide chain.
(*3)H: homopolymer, R: random copolymer, B: block copolymer
(*4)A: acrylate, M: methacrylate

COMPARATIVE PRODUCTION EXAMPLE 10

Compound No. B-1

92 g of a starting substance, glycerin, 11 g of a catalyst, potassium hydroxide, 2,640 g of ethylene oxide, and 870 g of propylene oxide were put into a 5-L autoclave, and reacted at 115° C. for 8 hours, and then neutralized, desalted and purified to obtain 3,580 g of a tri-functional ethylene oxide-propylene oxide random copolymer. This polymer had a molecular weight of 3,600 (as calculated from its hydroxyl value).

720 g (0.2 mols) of the copolymer, 65 g (0.9 mols) of acrylic acid, 1,000 g of toluene, and 5 g of a catalyst, paratoluenesulfonic acid were put into a 2-L four-neck flask, and reacted for 10 hours with stirring under reflux, while

COMPARATIVE PRODUCTION EXAMPLE 3

Compound No. B-3

134 g of a starting substance, trimethylolpropane, 5.9 g of a catalyst, potassium hydroxide, 1,320 g of ethylene oxide, and 522 g of propylene oxide were put into a 5-L autoclave, and reacted at 115° C. for 5 hours, and then neutralized, desalted and purified to obtain 1,920 g of a tri-functional ethylene oxide-propylene oxide random copolymer. This polymer had a molecular weight of 1,970 (as calculated from its hydroxyl value).

985 g (0.5 mols) of the copolymer, 162 g (2.25 mols) of acrylic acid, 1,000 g of toluene, and 5 g of a catalyst, paratoluenesulfonic acid were put into a 3-L four-neck flask, and reacted for 10 hours with stirring under reflux, while water formed was removed from the reaction system. Then, this was neutralized, desalted and purified, and toluene was removed therefrom. Thus was obtained a tri-functional, terminal acryloyl-modified ethylene oxide-propylene oxide random copolymer. The polymer had a molecular weight of 2,130 (as measured through GPC).

COMPARATIVE PRODUCTION EXAMPLE 4

Compound No. B-4

166 g of a starting substance, diglycerin, 20 g of a catalyst, potassium hydroxide, 1,760 g of ethylene oxide, and 2,880 g of butylene oxide were put into a 10-L autoclave, and reacted at 115° C. for 12 hours, and then neutralized, desalted and purified to obtain 4,790 g of a tetra-functional ethylene oxide-butylene oxide random copolymer. This polymer had a molecular weight of 4,800 (as calculated from its hydroxyl value).

480 g (0.1 mols) of the copolymer, 52 g (0.6 mols) of methacrylic acid, 1,000 g of toluene, and 5 g of a catalyst, sulfuric acid were put into a 3-L four-neck flask, and reacted for 10 hours with stirring under reflux, while water formed was removed from the reaction system. Then, this was neutralized, desalted and purified, and toluene was removed therefrom. Thus was obtained a tetra-functional, terminal acryloylated ethylene oxide-butylene oxide random copolymer. The polymer had a molecular weight of 5,010 (as measured through GPC).

COMPARATIVE PRODUCTION EXAMPLE 5

Compound No. B-5

136 g of a starting substance, pentaerythritol, 18 g of a catalyst, potassium hydroxide, and 3,520 g of ethylene oxide were put into a 10-L autoclave, and reacted at 100° C. for 10 hours. Next, 2,320 g of propylene oxide was added thereto and reacted at 115° C. for 12 hours, and then neutralized, desalted and purified to obtain 5,800 g of a tetra-functional ethylene oxide-propylene oxide block copolymer. This polymer had a molecular weight of 5,970 (as calculated from its hydroxyl value).

1,194 g (0.2 mols) of the copolymer, 86.5 g (1.2 mols) of acrylic acid, 2,000 g of toluene, and 20 g of a catalyst, paratoluenesulfonic acid were put into a 5-L four-neck flask, and reacted for 10 hours with stirring under reflux, while water formed was removed from the reaction system. Then, this was neutralized, desalted and purified, and toluene was removed therefrom. Thus was obtained a tetra-functional, terminal acryloylated ethylene oxide-propylene oxide block copolymer. The polymer had a molecular weight of 6,180 (as measured through GPC).

The structure and the molecular weight of those comparative polymers are shown in Table 2.

COMPARATIVE PRODUCTION EXAMPLE 6

Compound No. B-6

136 g of a starting substance, pentaerythritol, 30 g of a catalyst, potassium hydroxide, and 2,600 g of ethylene oxide were put into a 20-L autoclave, and reacted at 110° C. for 14 hours. Next, this was neutralized, desalted and purified to obtain 2,550 g of a tetra-functional ethylene oxide homopolymer. This polymer had a molecular weight of 2,250 (as calculated from its hydroxyl value).

225 g (0.1 mol) of the polymer, 43 g (0.6 mols) of acrylic acid, 300 g of toluene, and 30 g of a catalyst, paratoluenesulfonic acid were put into a 2-L four-neck flask, and reacted for 10 hours with stirring under reflux, while water formed was removed from the reaction system. Then, this was neutralized, desalted and purified, and toluene was removed therefrom. Thus was obtained a tetra-functional, terminal acryloylated ethylene oxide homopolymer. The polymer had a molecular weight of 2,460 (as measured through GPC).

The structure and the molecular weight of those comparative polymers are shown in Table 2.

TABLE 2

| Compound No. | Starting Substance(*1) | Minomer(*2) EO | PO | BO | Monomer Sequence(*3) | Molecular Weight of Non-modified Polymer | Terminal Group(*4) | Molecular Weight of Terminal-modified Polymer |
|---|---|---|---|---|---|---|---|---|
| B-1 | G | 20 | 5 | — | R | 3,600 | A | 3,760 |
| B-2 | DEG | 80 | 60 | — | R | 7,100 | A | 7,210 |
| B-3 | T | 10 | 3 | — | R | 1,970 | A | 2,130 |
| B-4 | DG | 10 | — | 10 | R | 4,800 | M | 5,010 |
| B-5 | PE | 20 | 10 | — | B | 5,970 | A | 6,180 |
| B-6 | PE | 12 | — | — | H | 2,250 | A | 2,460 |

(*1)G: glycerin, DEG: diethylene glycol
T: trimethylolpropane, DG: diglycerin
PE: pentaerythritol
(*2)EO: ethylene oxide, PO: propylene oxide, BO: butylene oxide
The numeral indicates the number of monomer units in one polyalkylene oxide chain.
(*3)R: random copolymer, B: block copolymer, H: homopolymer
(*4)A: acrylate, M: methacrylate (2) Production of Solid Electrolytes:

Using Compounds Nos. A-1 to A-10 and Nos. B-1 to B-5 produced in Production Examples and Comparative Production Examples, solid electrolytes were prepared in the manner mentioned below, and tested for their properties.

EXAMPLE 1

One g of Compound No. A-1 was mixed with 4 g of propylene carbonate containing 1 mol/liter of lithium perchlorate as dissolved therein, to which was added 0.2% by weight, relative to the resulting solution, of benzyldimethyl ketal to give a uniform solution. Then, this solution was cast onto a glass plate, and exposed to UV rays at an intensity of 30 mW/cm² for 3 minutes in a nitrogen atmosphere to form thereon a film of a solid electrolyte having a thickness of 500 μm.

The electroconductivity of the thus-formed solid electrolyte was measured through AC complex impedometry at 20° C., −10° C. and −20° C. For the measurement, used was a Hewlett-Packard's impedance analyzer, 4192A Model.

On the other hand, 5 g of Compound No. A-1 was dissolved in 3 g of MEK, cast onto a glass plate, and exposed to light at an intensity of 30 mW/cm² for 3 minutes in a nitrogen atmosphere. Then, the solvent was removed under reduced pressure at 60° C. for 48 hours to obtain a homocrosslinked product of Compound No. A-1. The crosslinked product was subjected to Soxhlet extraction using methylene chloride as the extractant to extract the remaining monomer therefrom, and its gel fraction was obtained according to the following equation.

Gel Fraction (%)=[(weight of extracted substance (g))/(weight of crosslinked product subjected to extraction (g))]×100

The curing speed of Compound No. A-1 was measured, using a UV exposure system equipped with a differential scanning calorimeter. For this, precisely, 1 g of Compound No. A-1 was mixed with 3 g of propylene carbonate containing 0.5 mols/liter of lithium perchlorate as dissolved therein, to give a uniform solution, to which was added 0.2% by weight, relative to the solution, of benzyldimethyl ketal. Then, the resulting solution was exposed to light at an intensity of 7 mW/cm² in a nitrogen atmosphere, whereupon the time at which the exothermic reaction terminated was measured. The thus-measured time indicates the end of the curing of the polymer.

EXAMPLE 2

One g of Compound No. A-2 was mixed with 6 g of propylene carbonate containing 0.5 mols/liter of lithium perchlorate as dissolved therein, to which was added 0.2% by weight, relative to the resulting solution, of benzyldimethyl ketal to give a uniform solution. Then, this solution was cast onto a glass plate, and exposed to UV rays at an intensity of 30 mW/cm² for 3 minutes in a nitrogen atmosphere to form thereon a film of a solid electrolyte having a thickness of 500 μm.

Except for the step noted above, Compound No. A-2 was processed in the same manner as in Example 1 to measure the electroconductivity, gel fraction and curing time of the samples prepared herein.

EXAMPLE 3

One g of Compound No. A-3 was mixed with 6 g of γ-butyrolactone containing 1.2 mols/liter of lithium perchlorate as dissolved therein, to which was added 0.2% by weight, relative to the resulting solution, of benzyldimethyl ketal to give a uniform solution. Then, this solution was cast onto a glass plate, and exposed to UV rays at an intensity of 30 mW/cm² for 3 minutes in a nitrogen atmosphere to form thereon a film of a solid electrolyte having a thickness of 500 μm.

Except for the step noted above, Compound. No. A-3 was processed in the same manner as in Example 1 to measure the electroconductivity, gel fraction and curing time of the samples prepared herein.

EXAMPLE 4

One g of Compound No. A-4 was mixed with 2 g of propylene carbonate containing 1 mol/liter of lithium tetraborofluoride as dissolved therein, and with 4 g of 1,2-dimethoxyethane containing 1 mol/liter of lithium tetraborofluoride as dissolved therein, to which was added 0.2% by weight, relative to the resulting solution, of benzyldimethyl ketal to give a uniform solution. Then, this solution was cast onto a glass plate, and exposed to UV rays at an intensity of 30 mW/cm² for 3 minutes in a nitrogen atmosphere to form thereon a film of a solid electrolyte having a thickness of 500 μm.

Except for the step noted above, Compound No. A-4 was processed in the same manner as in Example 1 to measure the electroconductivity, gel fraction and curing time of the samples prepared herein.

EXAMPLE 5

One g of Compound No. A-5 was mixed with 1 g of ethylene carbonate containing 1.5 mols/liter of lithium thiocyanate as dissolved therein, and. with 1 g of γ-butyrolactone containing 1.5 mols/liter of lithium thiocyanate as dissolved therein, to give a uniform solution, to which was added 0.2% by weight, relative to the resulting solution, of benzyldimethyl ketal. Then, this solution was cast onto a glass plate, and exposed to UV rays at an intensity of 30 mW/cm² for 3 minutes in a nitrogen atmosphere to form thereon a film of a solid electrolyte having a thickness of 500 μm.

Except for the step noted above, Compound No. A-5 was processed in the same manner as in Example 1 to measure the electroconductivity, gel fraction and curing time of the samples prepared herein.

EXAMPLE 6

One g of Compound No. A-6 was mixed with 15 g of propylene carbonate containing 2 mols/liter of lithium trifluoromethanesulfonate as dissolved therein, to which was added 0.2% by weight, relative to the resulting solution, of benzyldimethyl ketal to give a uniform solution. Then, this solution was cast onto a glass plate, and exposed to UV rays at an intensity of 30 mW/cm² for 3 minutes in a nitrogen atmosphere to form thereon a film of a solid electrolyte having a thickness of 500 μm.

Except for the step noted above, Compound No. A-6 was processed in the same manner as in Example 1 to measure the electroconductivity, gel fraction and curing time of the samples prepared herein.

EXAMPLE 7

One g of Compound No. A-7 was mixed with 2.5 g of ethylene carbonate containing 1 mol/liter of lithium tetraborofluoride as dissolved therein, and with 4 g of diethyl carbonate containing 1 mol/liter of lithium tetraborofluoride as dissolved therein, to which was added 0.2% by weight, relative to the resulting solution, of benzyldimethyl ketal to give a uniform solution. Then, this solution was cast onto a glass plate, and exposed to UV rays at an intensity of 30 mW/cm² for 3 minutes in a nitrogen atmosphere to form thereon a film of a solid electrolyte having a thickness of 500 μm.

Except for the step noted above, Compound No. A-7 was processed in the same manner as in Example 1 to measure the electroconductivity, gel fraction and curing time of the samples prepared herein.

EXAMPLE 8

One g of Compound No. A-8 was mixed with 2.5 g of sulfolane containing 0.8 mols/liter of lithium perchlorate as dissolved therein, to which was added 0.2% by weight, relative to the resulting solution, of benzyldimethyl ketal to give a uniform solution. Then, this solution was cast onto a glass plate, and exposed to UV rays at an intensity of 30 mW/cm$^2$ for 3 minutes in a nitrogen atmosphere to form thereon a film of a solid electrolyte having a thickness of 500 μm.

Except for the step noted above, Compound No. A-8 was processed in the same manner as in Example 1 to measure the electroconductivity, gel fraction and curing time of the samples prepared herein.

EXAMPLE 9

One g of Compound No. A-9 was mixed with 4 g of propylene carbonate containing 1.2 mols/liter of lithium perchlorate as dissolved therein, to which was added 0.2% by weight, relative to the resulting solution, of benzyldimethyl ketal to give a uniform solution. Then, this solution was cast onto a glass plate, and exposed to UV rays at an intensity of 30 mW/cm$^2$ for 3 minutes in a nitrogen atmosphere to form thereon a film of a solid electrolyte having a thickness of 500 μm.

Except for the step noted above, Compound No. A-9 was processed in the same manner as in Example 1 to measure the electroconductivity, gel fraction and curing time of the samples prepared herein.

EXAMPLE 10

One g of Compound No. A-10 was mixed with 8 g of propylene carbonate containing 1.5 mols/liter of bistrifluoromethylsulfonylimide lithium as dissolved therein to give a uniform solution. Then, this solution was cast onto a glass plate, and exposed to UV rays at an intensity of 30 mW/cm$^2$ for 3 minutes in a nitrogen atmosphere to form thereon a film of a solid electrolyte having a thickness of 500 μm.

Except for the step noted above, Compound No. A-10 was processed in the same manner as in Example 1 to measure the electroconductivity, gel fraction and curing time of the samples prepared herein.

COMPARATIVE EXAMPLE 1

In the same manner as in Example 1, except that 1 g of propylene carbonate containing 1.0 mol/liter of lithium perchlorate as dissolved therein was added to 1 g of Compound No. A-1, measured were the electroconductivity, gel fraction and curing time of the samples prepared herein.

COMPARATIVE EXAMPLE 2

One g of Compound No. B-1 was mixed with 4 g of propylene carbonate containing 1.0 mol/liter of lithium perchlorate as dissolved therein, and crosslinking of the polymer was tried in the same manner as in Example 1, which, however, gave a brittle solid electrolyte. The electroconductivity of the solid electrolyte formed herein could not be measured.

COMPARATIVE EXAMPLE 3

In the same manner as in Example 1, except that 3 g of propylene carbonate containing 1.2 mols/liter of lithium perchlorate as dissolved therein was added to 1 g of Compound No. B-2, the electroconductivity, gel fraction and curing time of the samples prepared herein were measured.

COMPARATIVE EXAMPLE 4

One g of Compound No. B-3 was mixed with 4 g of propylene carbonate containing 2.0 mols/liter of lithium perchlorate as dissolved therein, and crosslinking of the polymer was tried in the same manner as in Example 1, which, however, gave a brittle solid electrolyte. The electroconductivity of the solid electrolyte formed herein could not be measured.

COMPARATIVE EXAMPLE 5

One g of Compound No. B-4 was mixed with 4 g of propylene carbonate containing 1.0 mol/liter of lithium perchlorate as dissolved therein, and crosslinking of the polymer was tried in the same manner as in Example 1, which, however, gave a brittle solid electrolyte. The electroconductivity of the solid electrolyte formed herein could not be measured.

COMPARATIVE EXAMPLE 6

In the same manner as in Example 1, except that 2.5 g of propylene carbonate containing 1.0 mol/liter of lithium perchlorate as dissolved therein was added to 1 g of Compound No. B-5, the electroconductivity, gel fraction and curing time of the samples prepared herein were measured.

COMPARATIVE EXAMPLE 7

In the same manner as in Example 1, except that 2.5 g of propylene carbonate containing 1.0 mol/liter of lithium perchlorate as dissolved therein was added to 1 g of Compound No. B-6, the electroconductivity, gel fraction and curing time of the samples prepared herein were measured.

The data obtained in Examples and Comparative Examples are shown in Table 3.

TABLE 3

| | | Properties | | | | |
|---|---|---|---|---|---|---|
| | | Electroconductivity (S/cm) | | | Gel Fraction | Curing Time |
| Example | Compound No. | 20° C. | −10° C. | −20° C. | (%) | (min) |
| Ex. 1 | A-1 | $1.0 \times 10^{-3}$ | $4.0 \times 10^{-4}$ | $2.0 \times 10^{-4}$ | 0.05 | 4 |
| Ex. 2 | A-2 | $2.0 \times 10^{-3}$ | $6.9 \times 10^{-4}$ | $4.6 \times 10^{-4}$ | 0.05 | 4.1 |
| Ex. 3 | A-3 | $2.1 \times 10^{-3}$ | $9.0 \times 10^{-4}$ | $6.8 \times 10^{-4}$ | 0.08 | 4.5 |
| Ex. 4 | A-4 | $1.8 \times 10^{-3}$ | $5.2 \times 10^{-4}$ | $3.1 \times 10^{-4}$ | 0.06 | 5.5 |
| Ex. 5 | A-5 | $1.4 \times 10^{-3}$ | $8.0 \times 10^{-4}$ | $5.9 \times 10^{-4}$ | 0.06 | 6 |
| Ex. 6 | A-6 | $3.1 \times 10^{-3}$ | $1.0 \times 10^{-3}$ | $8.5 \times 10^{-4}$ | 0.10 | 8 |
| Ex. 7 | A-7 | $3.0 \times 10^{-3}$ | $2.2 \times 10^{-4}$ | $1.0 \times 10^{-4}$ | 0.06 | 6 |
| Ex. 8 | A-8 | $1.0 \times 10^{-3}$ | $5.1 \times 10^{-4}$ | $3.3 \times 10^{-4}$ | 0.08 | 6 |
| Ex. 9 | A-9 | $2.0 \times 10^{-3}$ | $6.0 \times 10^{-4}$ | $2.9 \times 10^{-4}$ | 0.09 | 5 |
| Ex. 10 | A-10 | $1.9 \times 10^{-3}$ | $4.0 \times 10^{-4}$ | $2.2 \times 10^{-4}$ | 0.3 | 10 |
| Comp. Ex. 1 | A-1 | $1.1 \times 10^{-4}$ | $8.0 \times 10^{-5}$ | $4.0 \times 10^{-5}$ | 0.05 | 4 |
| Comp. Ex. 2 | B-1 | — | — | — | 0.2 | 20 |
| Comp. Ex. 3 | B-2 | $9.4 \times 10^{-4}$ | $4.0 \times 10^{-4}$ | $1.0 \times 10^{-4}$ | 3.0 | 15 |
| Comp. Ex. 4 | B-3 | — | — | — | 5.0 | 25 |
| Comp. Ex. 5 | B-4 | — | — | — | 0.05 | 17 |
| Comp. Ex. 6 | B-5 | $8.9 \times 10^{-4}$ | $3.8 \times 10^{-4}$ | $2.9 \times 10^{-5}$ | 0.05 | 8 |
| Comp. Ex. 7 | B-6 | $2.0 \times 10^{-3}$ | $1.0 \times 10^{-4}$ | $7.6 \times 10^{-5}$ | 0.08 | 5 |

The solid electrolyte of the present invention has high conductivity and cures rapidly. In addition, as the amount of monomers remaining therein is small, the solid electrolyte has good workability. Using the solid electrolyte, therefore, obtained are electrochemical devices with high reliability.

In addition, since the polymer compound to be in the solid electrolyte is highly miscible with various solvents falling within a broad range, the solvent for the polymer compound can be selected from such a broad range, depending on the use of the solid electrolyte. The solid electrolyte of the invention comprising the polymer compound as combined with any desired solvent has high conductivity and therefore has many applications.

Where the amount of the solvent to be used in producing the solid electrolyte is defined within a specific range, the conductivity and the mechanical strength of the solid electrolyte are well balanced, or that is, the solid electrolyte may have high mechanical strength and high conductivity.

While the invention has been described in detail and with reference to specific embodiments thereof, it will be apparent to one skilled in the art that various changes and modifications can be made therein without departing from the spirit and scope thereof.

What is claimed is:

1. A solid electrolyte obtained by crosslinking a composition that consists essentially of a polymer compound, a solvent and an electrolytic salt through exposure to active radiation and/or under heat, wherein said polymer compound has a structure of a general formula (II):

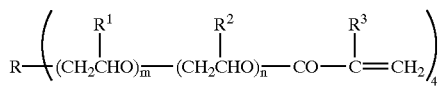

(II)

wherein R represents a residue of an active hydrogen compound selected from the group consisting of diglycerin, pentaerythritol, methyl glucoside and ethylene diamine;

$R^1$ and $R^2$ each represent a hydrogen atom or a lower alkyl group;

$R^3$ represents a hydrogen atom or a methyl group;

m and n each represent 0 or an integer of 1 or more, and m+n±35; and four R1's, R2's, m's and n's each may be the same or different, wherein if m and n is each an integer of 1 or more, then at least one of $R^1$ and $R^2$ is a lower alkyl group, if m is 0, then $R^2$ is a lower alkyl group, and if n is 0, then $R^1$ is a lower alkyl group.

2. The solid electrolyte as claimed in claim 1, wherein said solvent is at least one selected from the group consisting of cyclic esters, cyclic carbonates, cyclic ethers, nitriles, linear ethers, linear carboxylates, linear carbonates, sulfolane, sulfolane derivatives, dimethylsulfoxide, N,N-dimethylformamide, and N-methyloxazolidinone.

3. The solid electrolyte as claimed in claim 2, wherein the amount of the solvent is from 220 to 1,900% by weight relative to the polymer compound.

* * * * *